United States Patent
Champlain et al.

(10) Patent No.: US 7,890,872 B2
(45) Date of Patent: Feb. 15, 2011

(54) METHOD AND SYSTEM FOR REVIEWING A COMPONENT REQUIREMENTS DOCUMENT AND FOR RECORDING APPROVALS THEREOF

(75) Inventors: K. Susan G. Champlain, Goshen, NY (US); Macam S. Dattathreya, Sterling Heights, MI (US)

(73) Assignee: International Business Machines Corporation, Armonk, NY (US)

( * ) Notice: Subject to any disclaimer, the term of this patent is extended or adjusted under 35 U.S.C. 154(b) by 804 days.

(21) Appl. No.: 11/866,432

(22) Filed: Oct. 3, 2007

(65) Prior Publication Data

US 2009/0094530 A1    Apr. 9, 2009

(51) Int. Cl.
G06F 3/00 (2006.01)
G06F 3/048 (2006.01)

(52) U.S. Cl. .................. 715/741; 715/743; 715/745; 715/789

(58) Field of Classification Search .................. 715/740, 715/741, 743, 745, 748, 789, 861
See application file for complete search history.

(56) References Cited

U.S. PATENT DOCUMENTS

| | | | |
|---|---|---|---|
| 5,040,142 A | 8/1991 | Mori et al. | |
| 5,706,452 A | 1/1998 | Ivanov | |
| 7,069,592 B2 | 6/2006 | Porcari | |
| 7,234,131 B1 | 6/2007 | Speyrer et al. | |
| 7,434,166 B2 * | 10/2008 | Acharya et al. | ............. 715/740 |
| 2002/0133395 A1 | 9/2002 | Hughes et al. | |
| 2004/0098303 A1 * | 5/2004 | Truong et al. | ................. 705/14 |
| 2007/0043608 A1 * | 2/2007 | May et al. | ..................... 705/10 |

\* cited by examiner

*Primary Examiner*—Weilun Lo
*Assistant Examiner*—Truc T Chuong
(74) *Attorney, Agent, or Firm*—Schmeiser, Olsen & Watts; John R. Pivnichny

(57) ABSTRACT

A method and system for reviewing and recording approvals for a component requirements document (CRD). A document link to a CRD and a chart link to a condensed version of the CRD are inserted into a review database table. The CRD describes changes required for a software application component. Prior to a review meeting, reviewers activate the document link to display the CRD. During the review meeting, the reviewers activate the chart link to display the condensed version of the CRD for a review of the required changes. An annotation is inserted into the review database table in response to completing the review. The annotation indicates a readiness for an approval process in which the CRD is approved by approvers. A comment link to a sign off comment is inserted into a sign off database table. The sign off comment indicates an approval of the CRD.

18 Claims, 22 Drawing Sheets

*800*

| *Doc Type ⊖ | ⌐Reference⌐ ▷ |
| *Category ⊖ | ⌐Section 11 - Requirements⌐ ▷ |
| Project | ⌐CSP⌐ ▷ |
| For Attention Of | ⌐ ⌐ ▷ |
| Additional Editors | ⌐ ⌐ ▷ |
| Privacy | ⊙ All    ○ Private |
| Priority | ☐ Hot |

*Summary
⌐Documents for the CSP project component requirements review ⌐

Body
⌐

| Component name | Meeting minutes link | Review Charts/documents | Author | Review Date | Finalized |
|---|---|---|---|---|---|
|  |  |  |  |  |  |
|  |  |  |  |  |  |

*Doc Type ⊖ ⌐Reference↵▶
*Category ⊖ ⌐Section 11 - Requirements↵▶
Project ⌐CSP↵▶
For Attention Of ⌐↵▶
Additional Editors ⌐↵▶
Privacy ⊙ All  ○ Private
Priority ☐ Hot

*Summary
⌐ Documents for sign off: CSP project component requirements review ↵

Body
⌐

| Component name | Meeting minutes link | Reviewed Charts/documents for sign off | Document posted date | Approver names | Sign off date | Sign off link |
|---|---|---|---|---|---|---|
|  |  |  |  |  |  |  |
|  |  |  |  |  |  |  |

1.0 Business Objective .................................................................. 9
1.1 Introduction ........................................................................... 9
1.2 Specification Scope .............................................................. 9
1.3 Highlights of the component X changes ............................ 10

1.3 Highlights of the component X changes

Due to the CSP project, some of the component X rules are changing. Here are the highlights of the changes. The sections below this topic provide more detailed information.

- The XYZ logic is changing due to the new requirement ABCD *[NEW]*
- The UVZ calculation has to take the UBV factor before implementing new router configuration. *[ENHANCEMENT]*
- The HUX calculation must not change and should follow the same existing rules. *[BAU]*

- *Doc Type ⊖ ⌐Reference⌐ ▷
- *Category ⊖ ⌐Section 11 - Requirements⌐ ▷
- Project ⌐CSP⌐ ▷
- For Attention Of ⌐⌐ ▷
- Additional Editors ⌐⌐ ▷
- Privacy ⦿ All ○ Private
- Priority ☐ Hot

*Summary
⌐ Documents for the CSP project component requirements review ⌐

Body
⌐

| Component name | Meeting minutes link | Review Charts/documents | Author | Review date | Finalized |
|---|---|---|---|---|---|
| Component X | | Component_X_Specs v1.0.doc<br>Component_X_Charts v1.0.ppt | John Doe | 8/06/2007 | |

| | |
|---|---|
| *Doc Type ⊖ | ⌐Meeting ↵▶ |
| *Category ⊖ | ⌐Section 04 - Meetings ↵▶ |
| Project | ⌐CSP ↵▶ |
| *Meeting Date | Mon 08/06/2007  16 |
| Meeting Location/call-in | ↵ |
| *Meeting Time | 03:04 PM - 04:04 PM  ⊙ |
| Invitees | ↵▶ |
| Meeting Editors | ↵▶ |
| Privacy | ⊙ All   ○ Private |
| Priority | ☐ Hot |

*Summary
⌐Component X review meeting minutes ↵

Meeting Minutes

Reflect on your meeting as you record all topics and issues discussed, and any tabled conversations. What went well, or what would you do differently next time? Document those so others can take advantage of your learning.
⌐

*Doc Type ⊖ ┌Reference┘▸
*Category ⊖ ┌Section 11 - Requirements┘▸
Project ┌CSP┘▸
For Attention of ┌┘▸
Additional Editors ┌┘▸
Privacy ⊙ All ○ Private
Priority ☐ Hot

*Summary
┌Documents for the CSP project component requirements review┘

Body
┌

| Component name | Meeting minutes link | Review Charts/documents | Author | Review date | Finalized |
|---|---|---|---|---|---|
| Component X | Minutes link on 08/06/07: 🗄<br>Additional notes link: 08/06/07: 🗄 |  Component_X_Specs v1.0.doc<br> Component_X_Charts v1.0.ppt | John Doe | 8/06/2007 | |

| *Doc Type ⊖ | ⌐Reference⌐▷ |
| *Category ⊖ | ⌐Section 11 - Requirements⌐▷ |
| Project | ⌐CSP⌐▷ |
| For Attention Of | ⌐⌐▷ |
| Additional Editors | ⌐⌐▷ |
| Privacy | ⊙ All   ○ Private |
| Priority | ☐ Hot |

*Summary
⌐ Documents for sign off: CSP project component requirements review⌐

Body
⌐

| Component name | Meeting minutes link | Reviewed Charts/documents for sign off | Document posted date | Approver names | Sign off date | Sign off link |
|---|---|---|---|---|---|---|
| Component X | Minutes link on 08/06/07:<br>Additional notes 08/06/07: | Component_X_Specs v1.0.doc<br>Component_X_Charts v1.0.ppt | 8/12/2007 | | | |

*Summary:
⌐Sign off for the Component X ⌐

Body
⌐Completely accept the changes described. I officially sign off the changes documented in the Component_X_Specs v1.0.doc.

Signed by zyz
08/16/2007 2:30 p.m. ⌐

| *Doc Type | ⊖ | ⌐Reference ⌐▷ |
| *Category | ⊖ | ⌐Section 11 - Requirements ⌐▷ |
| Project | | ⌐CSP ⌐▷ |
| For Attention Of | | ⌐ ⌐▷ |
| Additional Editors | | ⌐ ⌐▷ |
| Privacy | | ⊙ All ○ Private |
| Priority | | ☐ Hot |

*Summary
⌐Documents for sign off: CSP project component requirements review ⌐

Body
⌐

| Component name | Meeting minutes link | Reviewed Charts/documents for sign off | Document posted date | Approver names | Sign off date | Sign off link |
|---|---|---|---|---|---|---|
| Component X | Minutes link on 08/06/07: 📄<br>Additional notes 08/06/07: 📄 | Component_X_Specs v1.0.doc<br>Component_X_Charts v1.0.ppt | 8/12/2007 | xyz, abcd | 8/16/2007 | 📄 |

*FIG. 19*

METHOD AND SYSTEM FOR REVIEWING A COMPONENT REQUIREMENTS DOCUMENT AND FOR RECORDING APPROVALS THEREOF

FIELD OF THE INVENTION

The present invention relates to a computer-implemented document management method and system for reviewing component requirements of a software application by multiple reviewers and for recording approvals thereof, and more particularly to a technique for utilizing customized review and sign off tables to facilitate a component requirements review and approval process.

BACKGROUND OF THE INVENTION

A modification of an existing software application necessitates changes in one or more components of the application. Each component's changes are detailed in a component requirements document. Conventional review of a component requirements document includes an inefficient, time-consuming identification of change details from among other information in the document. Further, conventional software tools for tracking the review of a component requirements document are expensive to implement and require labor-intensive and time-consuming customization related to assigning appropriate access privileges to each user who is involved in the review. Thus, there exists a need to overcome at least one of the preceding deficiencies and limitations of the related art.

SUMMARY OF THE INVENTION

The present invention provides a computer-implemented method of reviewing a component requirements document, the method comprising:

inserting, via a computing system, a document link into a review table residing in a database managed by the computing system, wherein the document link is a hyperlink to the component requirements document, and wherein the component requirements document includes a description of a component of a custom software application and a description of one or more changes required for the component;

inserting, via the computing system, a chart link into the review table, wherein the chart link is a hyperlink to a chart document that includes a condensed version of the component requirements document, and wherein the condensed version includes the description of the one or more changes;

displaying, via the computing system, the component requirements document for a review of the component requirements document by a plurality of reviewers prior to a review meeting, wherein the displaying the component requirements document is a result of a plurality of activations of the document link by the plurality of reviewers;

displaying, via the computing system and during the review meeting, the condensed version to the plurality of reviewers for a review of the one or more changes by the plurality of reviewers, wherein the displaying the condensed version is a result of a plurality of activations of the chart link by the plurality of reviewers; and inserting, via the computing system and in response to a completion of the review of the one or more changes, an annotation into the review table, wherein the annotation indicates a readiness for an approval process in which the component requirements document is approved by a plurality of approvers.

A system, computer program product, and a process for supporting computing infrastructure that provides at least one support service corresponding to the above-summarized method are also described and claimed herein.

Advantageously, the present invention provides a component requirements review and approval method and system that is simple and economical to implement without requiring installation of an expensive document management system (DBMS) such as an Oracles® or a DB2® DBMS. Further, the review and approval details required by the present invention are stored in simple and extensible table structures that allow viewing of entire documents as needed and that maintain controllability by tracking review dates and sign off dates. Still further, the component requirements review method disclosed herein provides a quick, effective, and simple-to-follow review process. Further yet, the present invention provides an easy-to-implement technique to record approvals of a component requirements document.

BRIEF DESCRIPTION OF THE DRAWINGS

FIG. 8 depicts a screen that includes a structure of an exemplary review table created in the process of FIG. 2, in accordance with embodiments of the present invention.

FIG. 9 depicts a screen that includes a structure of an exemplary sign off table created in the process of FIG. 2, in accordance with embodiments of the present invention.

FIG. 10 depicts an excerpt of an exemplary component requirements document developed in the process of FIG. 3, in accordance with embodiments of the present invention.

FIG. 11 depicts an example of a highlighted component changes section of the component requirements document of FIG. 10, where the section is developed in the process of FIG. 3, in accordance with embodiments of the present invention.

FIG. 12 depicts a screen that includes a modified version of the review table included in the screen of FIG. 8, where the review table is modified in the process of FIG. 3, in accordance with embodiments of the present invention.

FIG. 13 depicts a screen that includes an exemplary meeting minutes document for recording meeting minutes in the process of FIG. 5, where the review table is modified in the process of FIG. 5, in accordance with embodiments of the present invention.

FIG. 14 depicts a screen that includes a modified version of the review table included in the screen of FIG. 12, where the review table is modified in the process of FIG. 5, in accordance with embodiments of the present invention.

FIG. 16 depicts a screen that includes a modified version of the sign off table included in the screen of FIG. 9, where the sign off table is modified in the process of FIGS. 7A-7B, in accordance with embodiments of the present invention.

FIG. 17 depicts a screen that includes a modified version of the sign off table included in the screen of FIG. 16, where the sign off table is modified in the process of FIGS. 7A-7B, in accordance with embodiments of the present invention.

FIG. 18 depicts an exemplary sign off comment document created in the process of FIGS. 7A-7B, in accordance with embodiments of the present invention.

FIG. 19 depicts a screen that includes a modified version of the sign off table included in the screen of FIG. 17, where the sign off table is modified in the process of FIGS. 7A-7B, in accordance with embodiments of the present invention.

DETAILED DESCRIPTION OF THE INVENTION

Overview

The present invention provides an economical and efficient process for reviewing and recording approvals for a component requirements document (CRD) using two customized database tables—a review table and a sign off table. The review table is utilized by document reviewers and is structured to include the name of the component (i.e., software application component) whose required changes are described in the CRD, a link to the CRD, a link to charts related to the CRD, the author of the CRD and the date of a review meeting for reviewing the changes described in the CRD. The review table optionally includes a link to the minutes of the review meeting and an indicator of whether the CRD is signed off (a.k.a. approved). The sign off table is utilized by document approvers and is structured to include the name of the component, a link to a reviewed CRD, a link to reviewed charts related to the CRD, names of document approvers, and a link to a sign off comment. The sign off table optionally includes a link to the review meeting minutes, a date the CRD was posted to the sign off table for approval, and a date the CRD was approved by the approvers.

Component Requirements Document Review/Approval System

Figure 1:
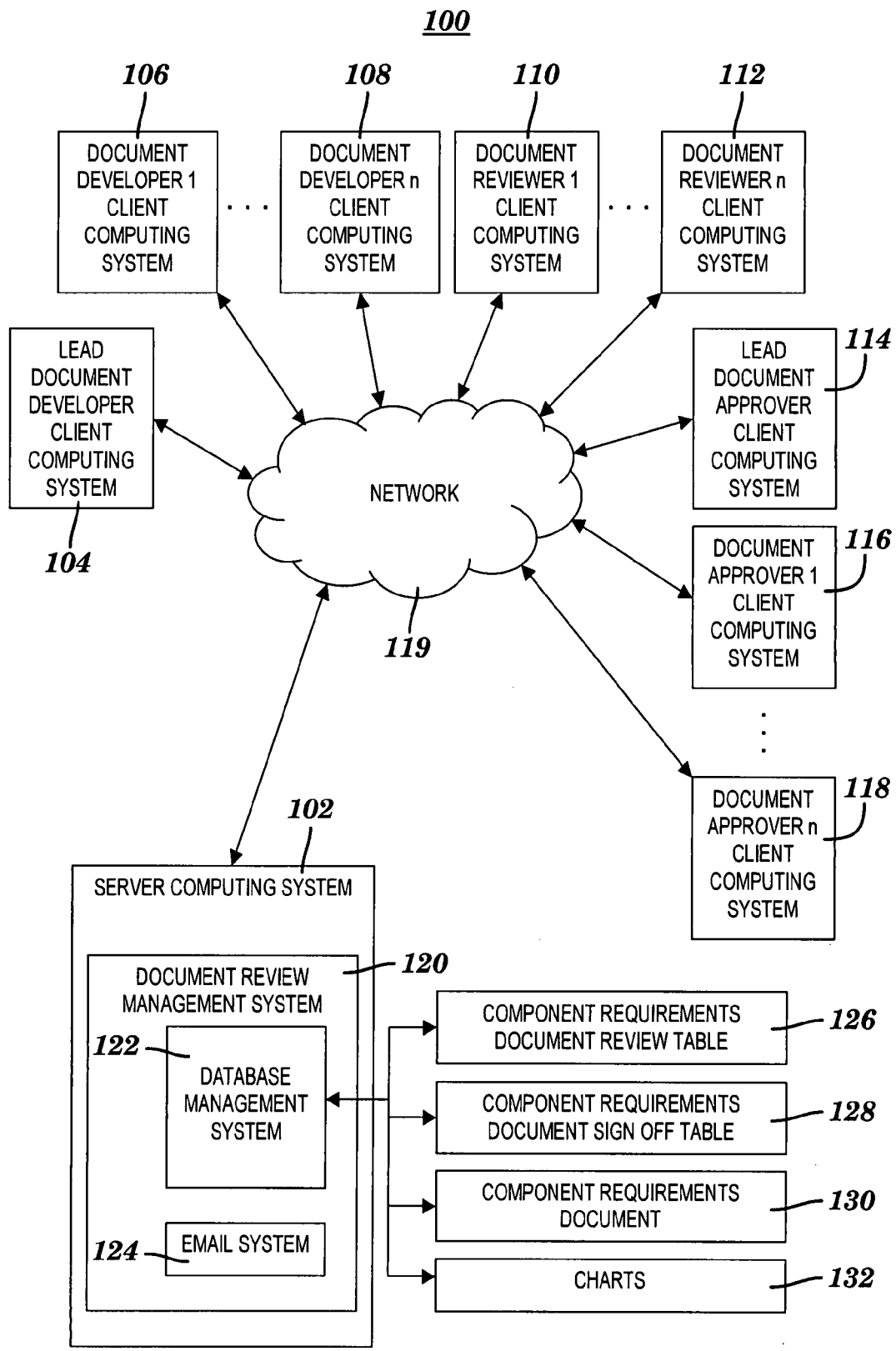
FIG. 1 is a block diagram of a system for reviewing and recording approvals for a component requirements document, in accordance with embodiments of the present invention.

FIG. 1 is a block diagram of a system for reviewing and recording approvals for a component requirements document, in accordance with embodiments of the present invention. System 100 includes a server computing system 102 in communication with multiple client computing systems 104, 106, 108, 110, 112, 114, 116 and 118 via a computer network 119. In one embodiment, all of the aforementioned client computing systems are different computing systems. In another embodiment, two or more of the aforementioned client computing systems are the same computing system.

Computing systems 104-118 are named for the type of user who uses them. For example, a lead document developer uses lead document developer client computing system 104, each of the multiple document developer client computing systems 106, 108 is used by a document developer, each of the multiple document reviewer client computing systems 110, 112 is used by a document reviewer. Further, a lead document approver uses lead document approver client computing system 114 and each of the multiple document approver client computing systems 116, 118 is used by a document approver. The actions performed by the lead document developer, the multiple document developers, the multiple document reviewers, the lead document approver and the multiple document approvers are described below relative to FIGS. 2-6 and FIGS. 7A-7B.

Server computing system 102 includes a document review management system 120, which includes a database management system 122 and an email system 124. Document review management system 120 is a part of a collaboration software application, such as Lotus® Notes® offered by International Business Machines Corporation located in Armonk, N.Y. In one embodiment, document review management system 120 provides integrated and enterprise-wide database and email functionality. Database management system 122 accesses and manages data in a component requirements document review table 126, a component requirements document sign off table 128, a component requirements document 130 and one or more charts 132. Hereinafter, component requirements document review table 126 is simply referred to as review table 126 and component requirements document sign off table 128 is simply referred to as sign off table 128. Herein, one or more charts 132 (see FIG. 1) are also referred to as "related charts" (i.e., charts that are related to the component requirements document 130 of FIG. 1).

Review table 126 and sign off table 128 are not relational tables; instead tables 126 and 128 are independent or loosely coupled tables. Even though some of the columns in tables 126 and 128 have similar content, an entry in table 126 does not require an equivalent entry in table 128, and vice versa. Further, the order of entries in a column of table 126 does not have a relationship to the order of entries in a column of table 128, and vice versa.

As used herein, a component requirements document is defined as an electronic document that includes details of component requirements (a.k.a. component changes) included in a design of a component of a custom software application. As used herein, a component change is a change to a component of a custom software application, where the change is being done to satisfy the requirements of a customer. Component requirements document 130 is, for example, a word processing document. Hereinafter, "the component" refers to a component of a custom software application whose component requirements are included in component requirements document 130.

One or more charts 132 include screenshots, graphics and/or other illustrative elements that provide a condensed version of component requirements document 130, where the condensed version emphasizes the component changes. One or more charts 132 are included in, for example, a Microsoft® PowerPoint® presentation file.

In one embodiment, database management system 122 and email system 124 are provided by a single collaboration application, such as the database and email systems provided by a Lotus® Notes® server (e.g., Lotus® Domino® offered by International Business Machines Corporation).

Component Requirements Document Review/Approval Process

Figure 2:
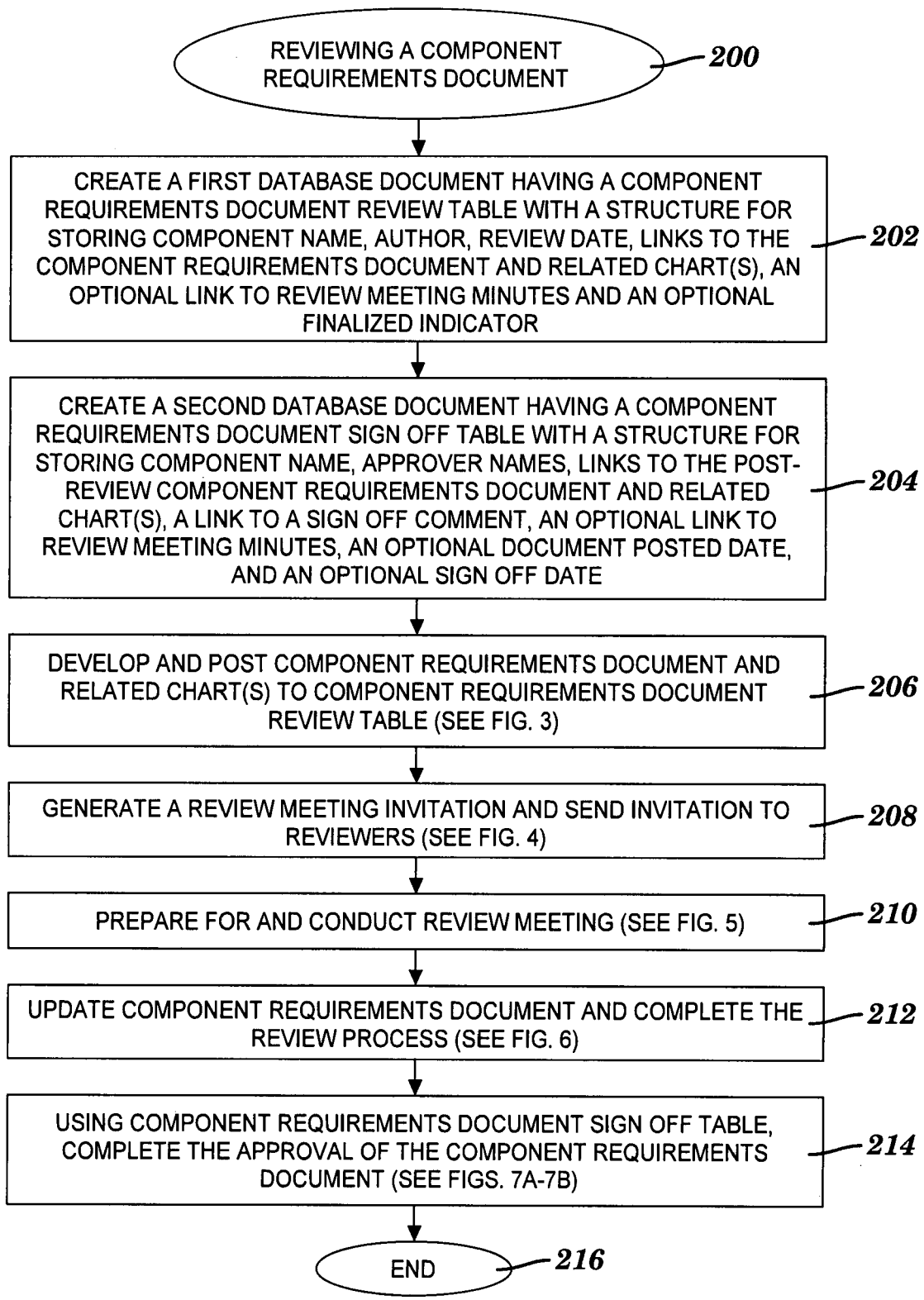
FIG. 2 is a flow diagram of a component requirements review and approval process implemented by the system of FIG. 1, in accordance with embodiments of the present invention.

FIG. 2 is a flow diagram of a component requirements review and approval process implemented by the system of FIG. 1, in accordance with embodiments of the present invention. The component requirements review and approval process begins at step 200. In step 202, the lead document developer creates a first database document (e.g., a Lotus® Notes® database document) having review table 126 (see FIG. 1). Review table 126 (see FIG. 1) has a structure for storing (1) an identifier (e.g., name) of the component that requires the one or more changes described in component requirements document 130 (see FIG. 1); (2) an optional identifier of the author (e.g., name of a document developer) of component requirements document 130 (see FIG. 1); (3) a review date (i.e., the date on which component requirements document 130 (see FIG. 1) is scheduled to be reviewed or the date on which the document 130 (see FIG. 1) was reviewed; (4) links (a.k.a. hyperlinks) to component requirements document 130 (see FIG. 1) and one or more charts 132 (see FIG. 1) related to component requirements document 130 (see FIG. 1); (5) an optional link to a document (e.g., a Lotus® Notes® database document) that includes minutes recorded for a meeting at which component requirements document 130 (see FIG. 1) was reviewed; and (6) an optional finalized indicator that indicates whether or not component requirements document 130 (see FIG. 1) was signed off (i.e., approved). For example, the finalized indicator is Y if component requirements document 130 (see FIG. 1) is approved and N if the component requirements document is not approved.

Following step 202, edit access to review table 126 (see FIG. 1) is granted to the multiple document developers.

In step 204, the lead document developer creates a second database document (e.g., a Lotus® Notes® database document) having a sign off table 128 (see FIG. 1). The sign off table 128 (see FIG. 1) has a structure for storing (1) an identifier (e.g., name) of the component whose component requirements document 130 (see FIG. 1) is ready to be approved; (2) identifiers (e.g., names) of document approvers (i.e., approvers of component requirements document 130 of FIG. 1); (3) a link to the post-review component requirements document 130 (see FIG. 1) and the related one or more charts 132 (see FIG. 1); (4) a link to a sign off comment (e.g., a link to a comment document added to the second database document via the Lotus® Notes® comment feature); (5) an optional link to a document (e.g., a Lotus® Notes® database document) that includes minutes recorded for a meeting at which component requirements document 130 (see FIG. 1) was reviewed; (6) an optional document posted date (i.e., the date on which component requirements document 130 of FIG. 1 was posted for approval; and (7) an optional sign off date (i.e., the date on which component requirements document 130 of FIG. 1 was approved by the document approvers).

In step 206, the document developers develop and post component requirements document 130 (see FIG. 1) to review table 126 (see FIG. 1). Step 206 is described in more detail in FIG. 3. In step 208, the lead document developer or lead document approver generates a review meeting invitation and sends the invitation to the document reviewers. Details of step 208 are described below relative to FIG. 4.

In step 210, the lead document developer or another meeting leader conducts a review meeting (e.g., a web conference) attended by multiple document reviewers. At the review meeting and following the review meeting, document reviewers review the required component changes in the one or more charts 132 (see FIG. 1) and may also review relevant sections of the component requirements document 130 (see FIG. 1) to check whether components used within the software application are designed properly and whether component requirements are documented properly. Details of step 210 are included in FIG. 5.

Although not shown in FIG. 2, a determination is made (e.g., by the lead document developer) following step 210 and prior to step 212 whether the issues raised at the review meeting require any updates to component requirements document 130 (see FIG. 1). If one or more of such updates are not required, then the document review process skips step 212 and continues with step 214; otherwise, the document review process continues with step 212.

In step 212, the document developers update component requirements document 130 (see FIG. 1) based on the issues raised at the review meeting conducted in step 210. Step 212 also includes the document developers, the lead document developer and the document reviewers completing the document review process. The discussion presented below relative to FIG. 6 includes details of step 212.

In step 214, the lead document developer and the lead document approver uses sign off table 128 (see FIG. 1) to complete the approval of component requirements document 130 (see FIG. 1). The details of step 214 are described below relative to FIGS. 7A-7B. The component requirements document review and approval process of FIG. 2 ends at step 216.

Figure 3:
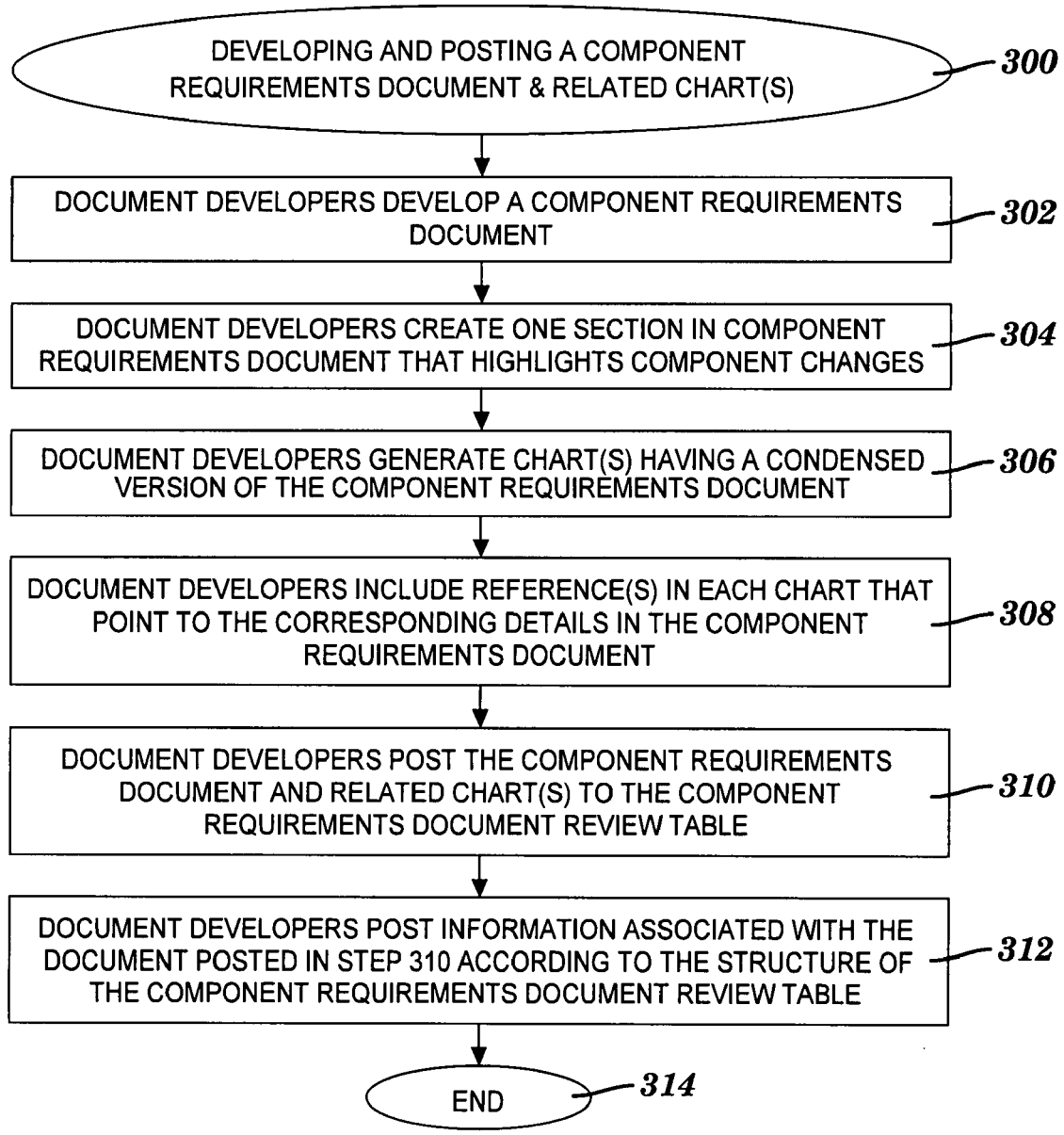
FIG. 3 is a flow diagram of a component requirements document and charts development and posting process included in the process of FIG. 2, in accordance with embodiments of the present invention.

FIG. 3 is a flow diagram of a component requirements document and charts development and posting process included in the process of FIG. 2, in accordance with embodiments of the present invention. The component requirements document and charts development and posting process starts at step 300. In step 302, document developers develop component requirements document 130 (see FIG. 1) that includes the component requirements based on predefined business and computing system requirements. Document developers use a word processing system and an existing component requirements document template to create the component requirements document in step 302.

In step 304, document developers create one section (a.k.a. a component changes section) in component requirements document 130 (see FIG. 1) that highlights the required component changes. The document developers identify each detail in the component changes section as being (1) a change that adds a feature that is not included in the existing component behavior; (2) a change that modifies existing component behavior; or (3) unchanged component behavior. For example, in the component changes section, document developers insert [New] to identify an a change that adds a feature not already included in existing component behavior, [Enhancement] to identify a change that modifies existing component behavior, and [BAU] (i.e., an abbreviation for "business as usual") to identify unchanged component behavior.

In one embodiment, details in the component changes section of component requirements document 130 (see FIG. 1) include links that are activated by document reviewers who need to review related information located elsewhere in the component requirements document. Activating one of these links in this embodiment displays a particular section of component requirements document 130 (see FIG. 1) that includes information associated with the component change.

After component requirements document 130 (see FIG. 1) is completely developed and ready for review, document developers generate in step 306 one or more charts 132 (see FIG. 1) (e.g., slides generated with Microsoft® Power- Point®) that have a condensed version of component requirements document 130 (see FIG. 1). One or more charts 132 (see FIG. 1) include and emphasize concise, summarized descriptions and/or illustrations of the component changes that are detailed in component requirements document 130 (see FIG. 1). For each component change described on a chart 132 (see FIG. 1), the document developers include in step 308 one or more references (e.g., statements) in the chart that identify a database and a document where more detailed information about the component change is located. The aforementioned more detailed information referenced by the one or more charts 132 (see FIG. 1) is not included in the charts themselves.

The one or more charts 132 (see FIG. 1) emphasize screenshots and/or tables over information presented as text. As one example, screenshots are included in a chart 132 (see FIG. 1) to illustrate what happens when a user activates an onscreen link. As another example, a rule table is included in a chart 132 (see FIG. 1) to facilitate the reviewers' understanding of a set of rules. Text to describe such a rule table is included in the component requirements document 130 (see FIG. 1), but is not included in the chart itself. The screenshots, tables and any other information included in the one or more charts 132 (see FIG. 1) is also included in component requirements document 130 (see FIG. 1).

Further, the one or more charts 132 (see FIG. 1) highlight any complex logic or complex rules included in a component change. For example, complex logic in a chart is highlighted by presenting the text of the complex logic in a distinctive color.

Still further, the one or more charts 132 (see FIG. 1) highlight any business control points that are part of the description of a component change. As used herein, a business control point is defined as an action or condition that controls the transfer of data from one point to another. For example, a chart 132 (see FIG. 1) includes a bulleted list of descriptions of actions that verify that data being sent to a recipient is completely received by the recipient (e.g., obtaining an email return receipt verifies that the email's recipient received the email).

In step 310, document developers post component requirements document 130 (see FIG. 1) and the one or more charts 132 (see FIG. 1) to review table 126 (see FIG. 1) using a native functionality of database management system 122 (see FIG. 1). Via the posting in step 310, the database management system 122 (see FIG. 1) inserts a link to component requirements document 130 (see FIG. 1) and a link to the one or more related charts 132 (see FIG. 1) into review table 126 (see FIG. 1). For example, the links to the component requirements document and the related charts are inserted in a column of review table 126 (see FIG. 1) that indicates charts and documents to be reviewed. The links are inserted in step 310 using a linking feature native to, for example, a Lotus® Notes® document.

In one embodiment, step 310 is performed automatically. For example, a document developer sends an email via email system 124 (see FIG. 1), where the email has the component requirements document and the one or more related charts attached. The email attachments are received and stored by, for instance, a Lotus® Notes® database that also inserts links into review table 126 (see FIG. 1), where the links provide access to the stored component requirements document and related charts.

In step 312, document developers post information associated with the component requirements document posted in step 310 according to the structure of review table 126 (see FIG. 1), which was created in step 202 (see FIG. 2). For example, document developers insert the following information in review table 126 (see FIG. 1): the author of component requirements document 130 (see FIG. 1) and the review date associated with component requirements document 130 (see FIG. 1). The component requirements document development and posting process ends at step 314.

Figure 4:
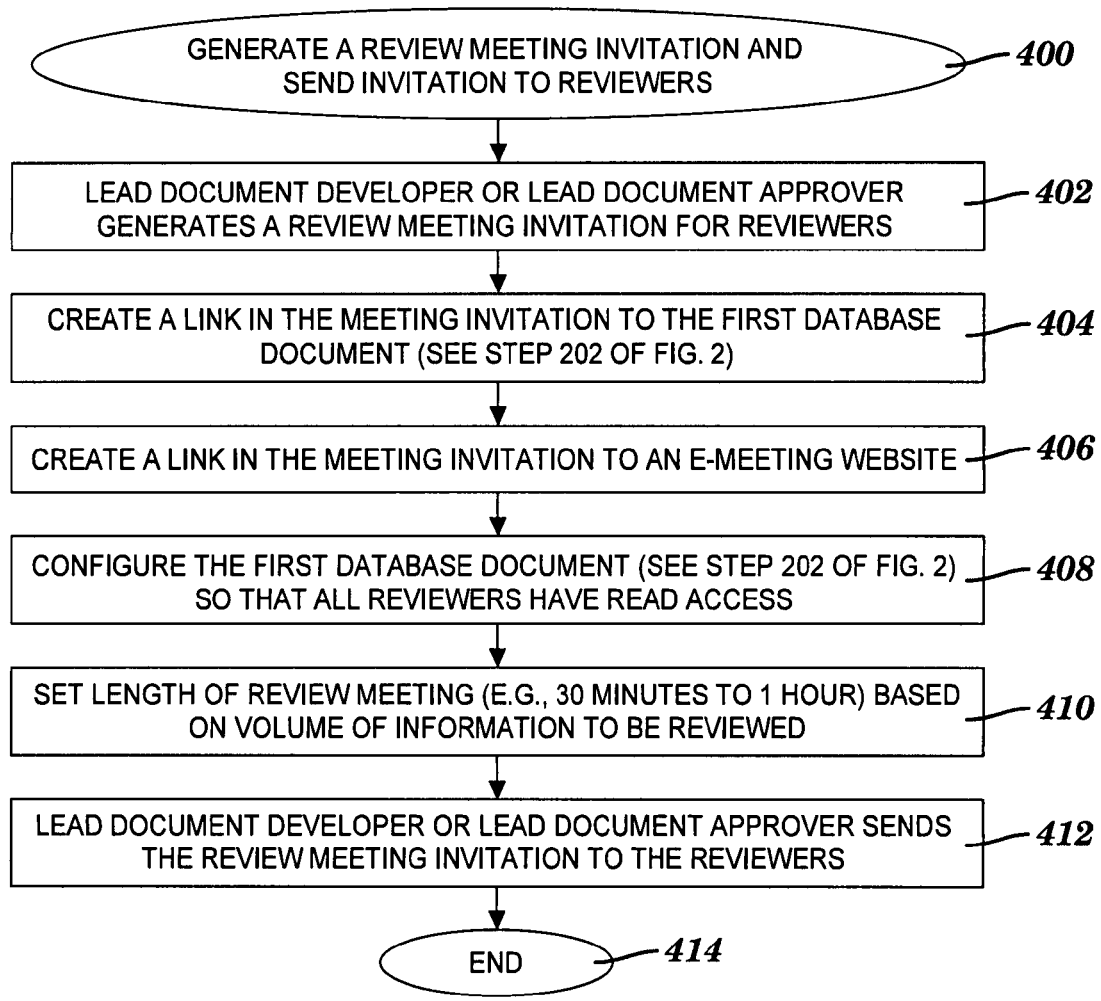
FIG. 4 is a flow diagram of a review meeting invitation generation and sending process included in the process of FIG. 2, in accordance with embodiments of the present invention.

FIG. 4 is a flow diagram of a review meeting invitation generation and sending process included in the process of FIG. 2, in accordance with embodiments of the present invention. The review meeting invitation generation and sending process begins at step 400. In step 402, the lead document developer or lead document approver starts generating an invitation to a review meeting that will be attended by the document reviewers. The review meeting is an electronic meeting (e-meeting) (e.g., a web conference) during which the document reviewers review component requirements document 130 (see FIG. 1). The review meeting invitation is generated, for example, using the meeting invitation feature of Lotus® Notes®.

In step 404, the lead document developer or lead document approver creates a link in the meeting invitation to the first database document that was created in step 202 of FIG. 2. Document reviewers who receive the meeting invitation by email system 124 (see FIG. 1) may attempt to access to the information in review table 126 (see FIG. 1) via the link created in step 404.

In step 406, the lead document developer or lead document approver creates a link in the meeting invitation to an e-meeting website through which the review meeting will be conducted. Document reviewers who receive the meeting invitation by email system 124 (see FIG. 1) may attend the review meeting via the link created in step 406.

In step 408, the lead document developer or lead document approver configures the first database document created in step 202 (see FIG. 2) so that all document reviewers receiving the meeting invitation have read access relative to information in the first database document (e.g., information in the review table 126 of FIG. 1)

In step 410, the lead document developer or lead document approver sets the length of the review meeting based on the volume of information to be reviewed at the review meeting. In one embodiment, step 410 sets the length of the review meeting in the range of 30 minutes to one hour, inclusive.

In step 412, the lead document developer or lead document approver initiates the sending of the review meeting invitation to the document reviewers via email system 124 (see FIG. 1). Email system 124 (see FIG. 1) sends the invitation to the document reviewers, who upon receipt of the invitation have access to review table 126 (see FIG. 1) via the link created in step 404. The review meeting invitation generation and sending process ends at step 414.

Figure 5:
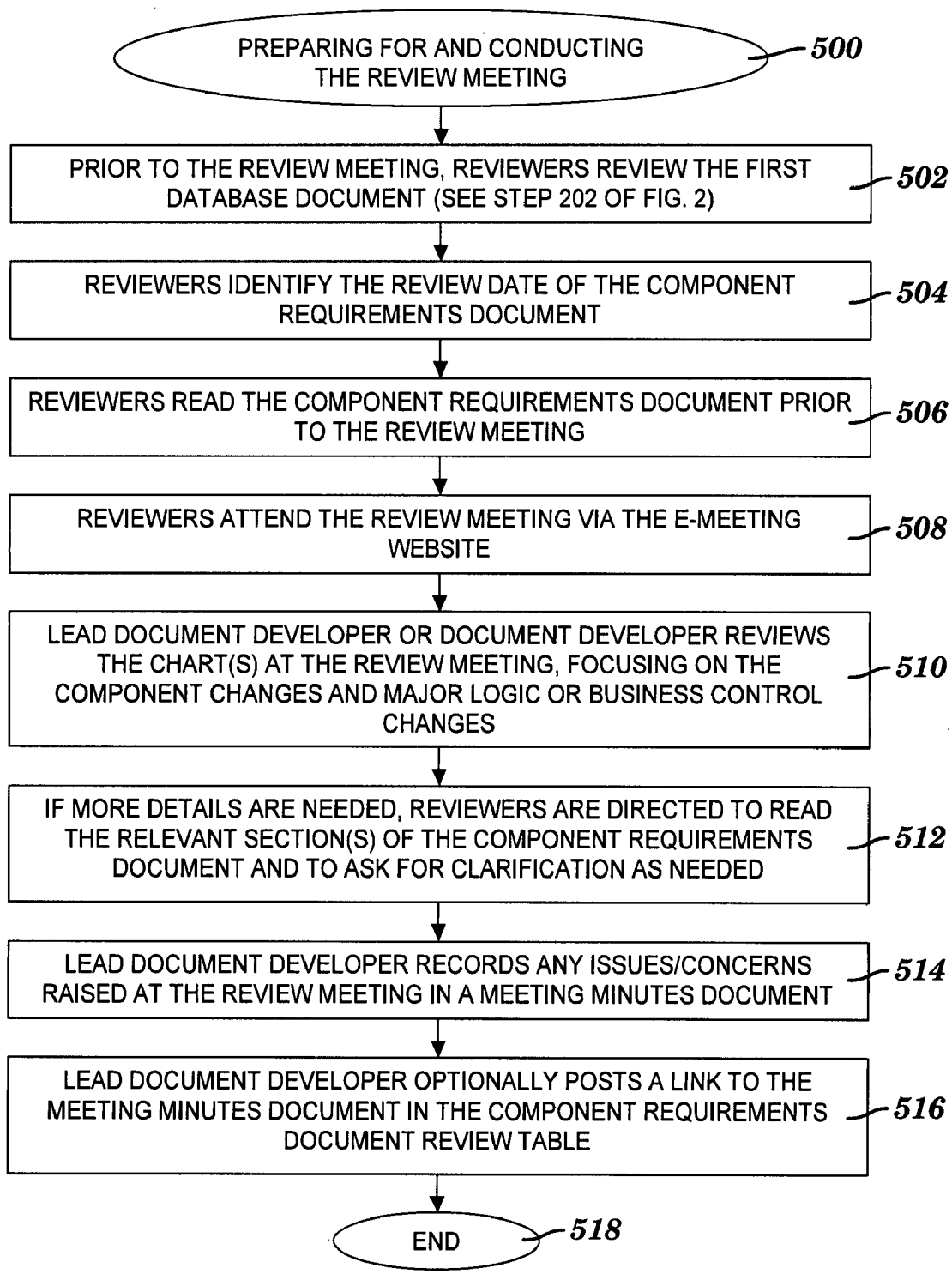
FIG. 5 is a flow diagram of a review meeting process included in the process of FIG. 2, in accordance with embodiments of the present invention.

FIG. 5 is a flow diagram of a review meeting process included in the process of FIG. 2, in accordance with embodiments of the present invention. Step 500 begins the process for preparing for and conducting the review meeting for which the process of FIG. 4 generates an invitation to document reviewers. Prior to conducting the review meeting, in step 502, document reviewers review the first database document created in step 202 (see FIG. 2) by activating the link created in step 404 (see FIG. 4). In response to an activation of the link created in step 404 by a document reviewer, database management system 122 (see FIG. 1) displays review table 126 (see FIG. 1) to the document reviewer for viewing by the document reviewer. The display of review table 126 (see FIG. 1) includes displaying the identifier of the component, the review date, and the document link inserted in step 310 (see FIG. 3). In step 504, document reviewers who are viewing the review table 126 (see FIG. 1) displayed in step 502 identify the review date of component requirements document 130 (see FIG. 1).

In step 506, the document reviewers activate the document link included in review table 126 (see FIG. 1). In response to the activation of the document link, database management system 122 (see FIG. 1) displays component requirements document 130 (see FIG. 1) to the document reviewers. The document reviewers read the displayed component requirements document 130 (see FIG. 1) prior to the start of the review meeting. In step 508, the document reviewers attend the review meeting to which the reviewers were invited via the process of FIG. 4. For example, the document reviewers attend the review meeting by activating the e-meeting link created in step 406 (see FIG. 4).

In step 510, the lead document developer or a document developer directs a review of the one or more charts 132 (see FIG. 1). During the review meeting, the document reviewers focus on reviewing component changes, major logic changes and business control changes illustrated and/or described in one or more charts 132 (see FIG. 1). The review meeting does not include a review of the component requirements document 130 (see FIG. 1). Step 510 also includes the document reviewers activating the chart link included in review table 126 (see FIG. 1). In response to the activation of the chart link, database management system 122 (see FIG. 1) displays the one or more related charts 132 (see FIG. 1) to the document reviewers. The document reviewers review the component changes during the review meeting via an examination of the one or more charts 132 (see FIG. 1) displayed in step 510.

In step 512, document reviewers ask for clarifications of information in the one or more charts 132 (see FIG. 1). If more details are needed, the document reviewers are directed in step 512 to read relevant section(s) of component requirements document 130 (see FIG. 1). The relevant section(s) include details that provide the clarifications the reviewers need. The document reviewers read the relevant section(s) after the review meeting is concluded.

In step 514, the lead document developer or a document reviewer records any issues and/or concerns raised at the review meeting in a meeting minutes document (e.g., a separate component-specific Lotus® Notes® document). In step 516, the lead document developer optionally posts a link to the meeting minutes document described in step 514, where the link is inserted into review table 126 (see FIG. 1) by database management system 122 (see FIG. 1). The review meeting process ends at step 518.

Figure 6:
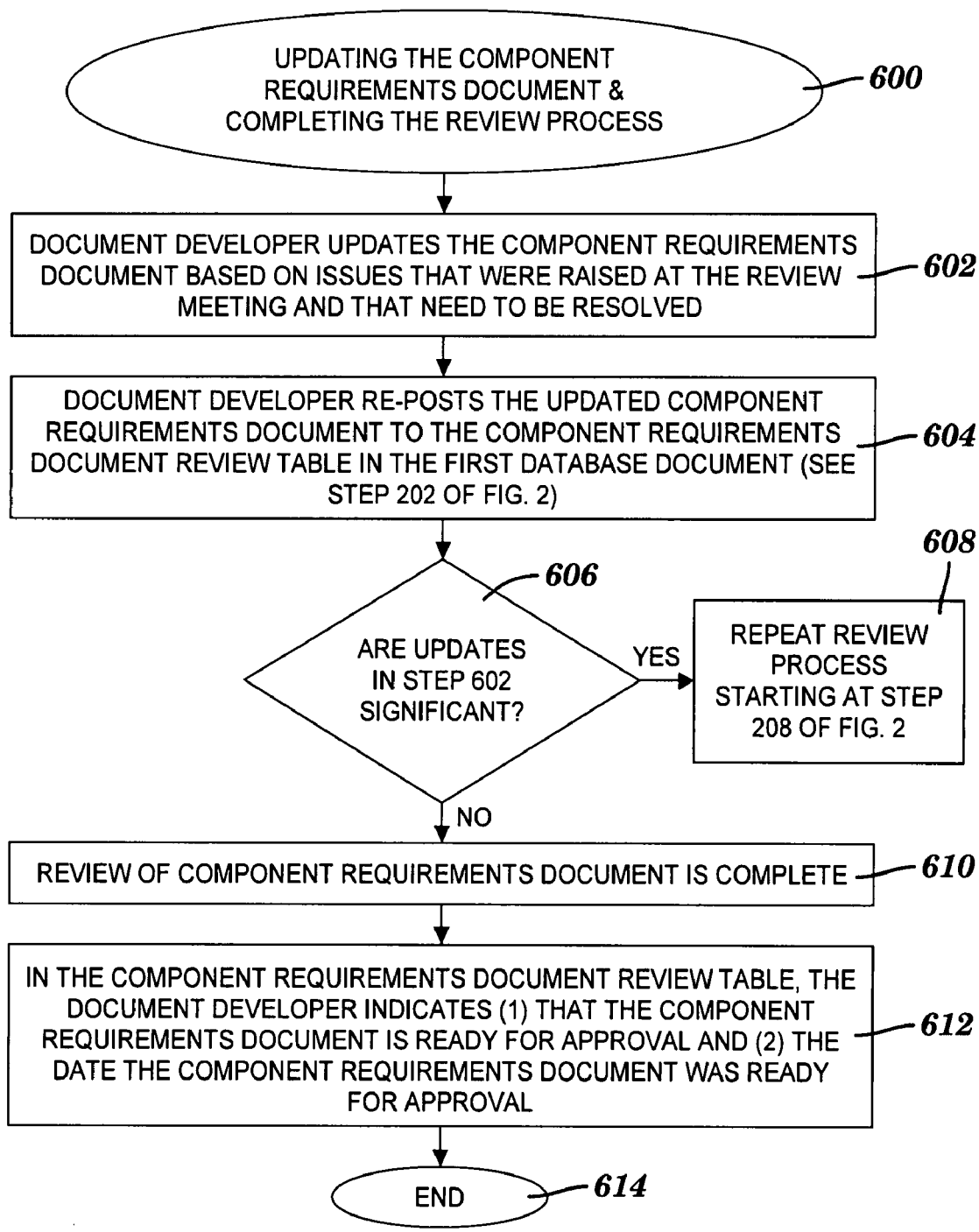
FIG. 6 is a flow diagram of a component requirements document update and review completion process included in the process of FIG. 2, in accordance with embodiments of the present invention.

FIG. 6 is a flow diagram of a component requirements document update and review completion process included in the process of FIG. 2, in accordance with embodiments of the present invention. The component requirements document update and review process completion process begins at step 600. In step 602, the document developer activates the link to the review meeting minutes document which was inserted in review table 126 (see FIG. 1) in step 516 (see FIG. 5). In response to the activation of the link to the review meeting minutes document, database management system 122 (see FIG. 1) displays the review meeting minutes document to the document developer. Based on a review of the issues that were recorded in the displayed meeting minutes document (see step 514 of FIG. 5) and that need to be resolved, the document developer in step 602 updates component requirements document 130 (see FIG. 1) and database management system 122 (see FIG. 1) receives the updated component requirements document.

In step 604, the document developer re-posts the updated component requirements document 130 (see FIG. 1) to review table 126 (see FIG. 1). In response to the re-posting in step 604, database management system 122 (see FIG. 1) re-inserts the document link into review table 126 (see FIG. 1), where the re-inserted document link is a hyperlink to the updated component requirements document.

If step 606 determines that the updates provided in step 602 are significant based on predefined conditions, then in step 608 the review process repeats starting at step 208 of FIG. 2; otherwise, the review of the component requirements document 130 (see FIG. 1) is complete in step 610. The lead document developer and the lead document approver makes the determination in step 606 based on the complexity of the changes and the number of issues raised by the document reviewers at the review meeting.

In step 612, a document developer (e.g., the author of the component requirements document) generates an annotation and the database management system 122 (see FIG. 1) inserts the annotation into review table 126 (see FIG. 1). The annotation generated in step 612 indicates (1) that component requirements document 130 (see FIG. 1) is ready for approval by a plurality of document approvers and (2) the date the component requirements document is ready for approval. The component requirements document 130 (see FIG. 1) is ready for approval by the document approvers when no further updates to the component requirements document are necessary and no outstanding issues related to the component requirements document need to be resolved. For example, the annotation "Ready for sign off (08/12/2007)" is generated by the document developer and is inserted into the column of review table 126 (see FIG. 1) that includes the links to the component requirements document and the related charts. The process of FIG. 6 ends at step 614.

Figure 7A:
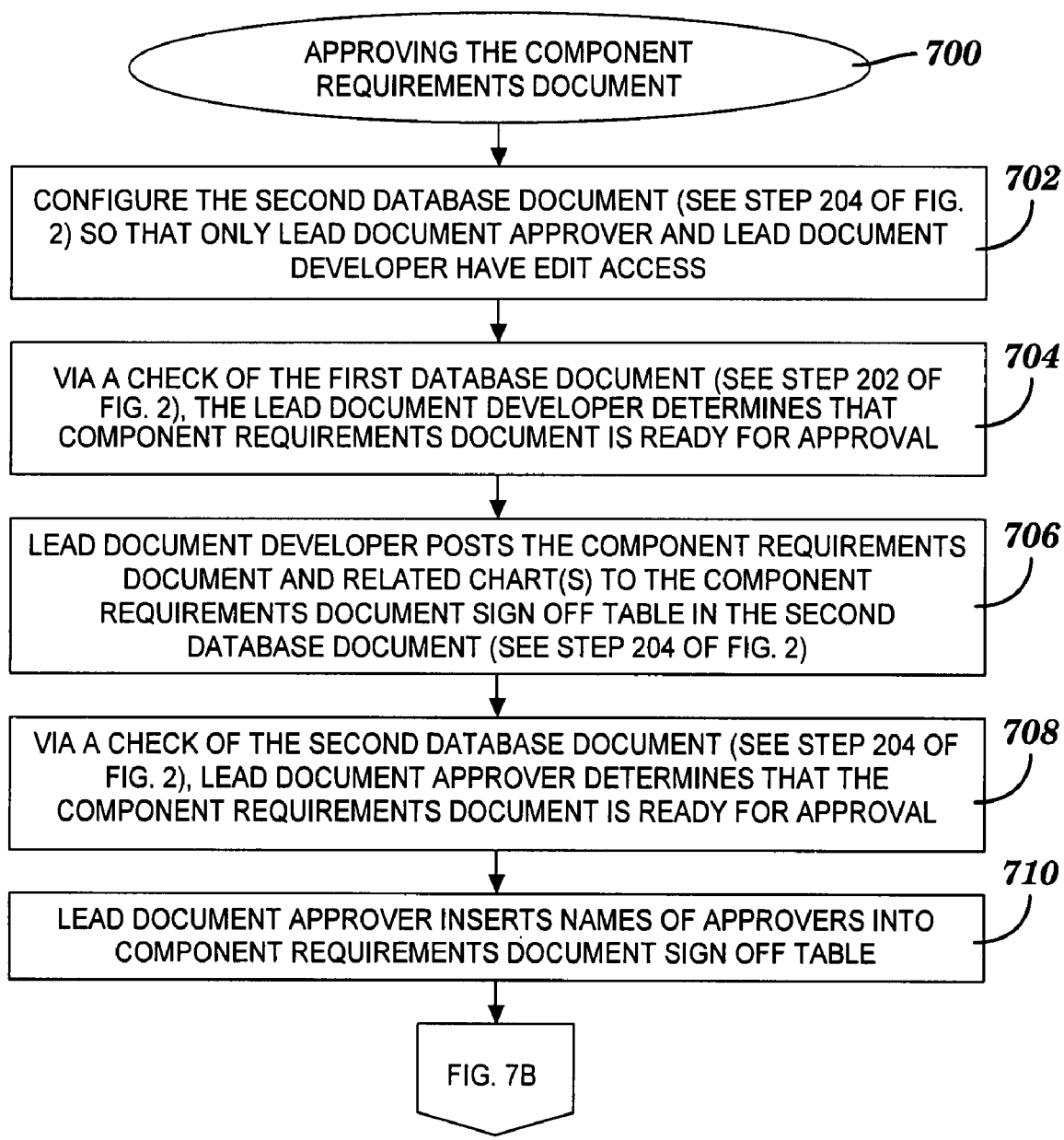
FIGS. 7A-7B depict a flow diagram of a component requirement document approval process included in the process of FIG. 2, in accordance with embodiments of the present invention.
Figure 7B:
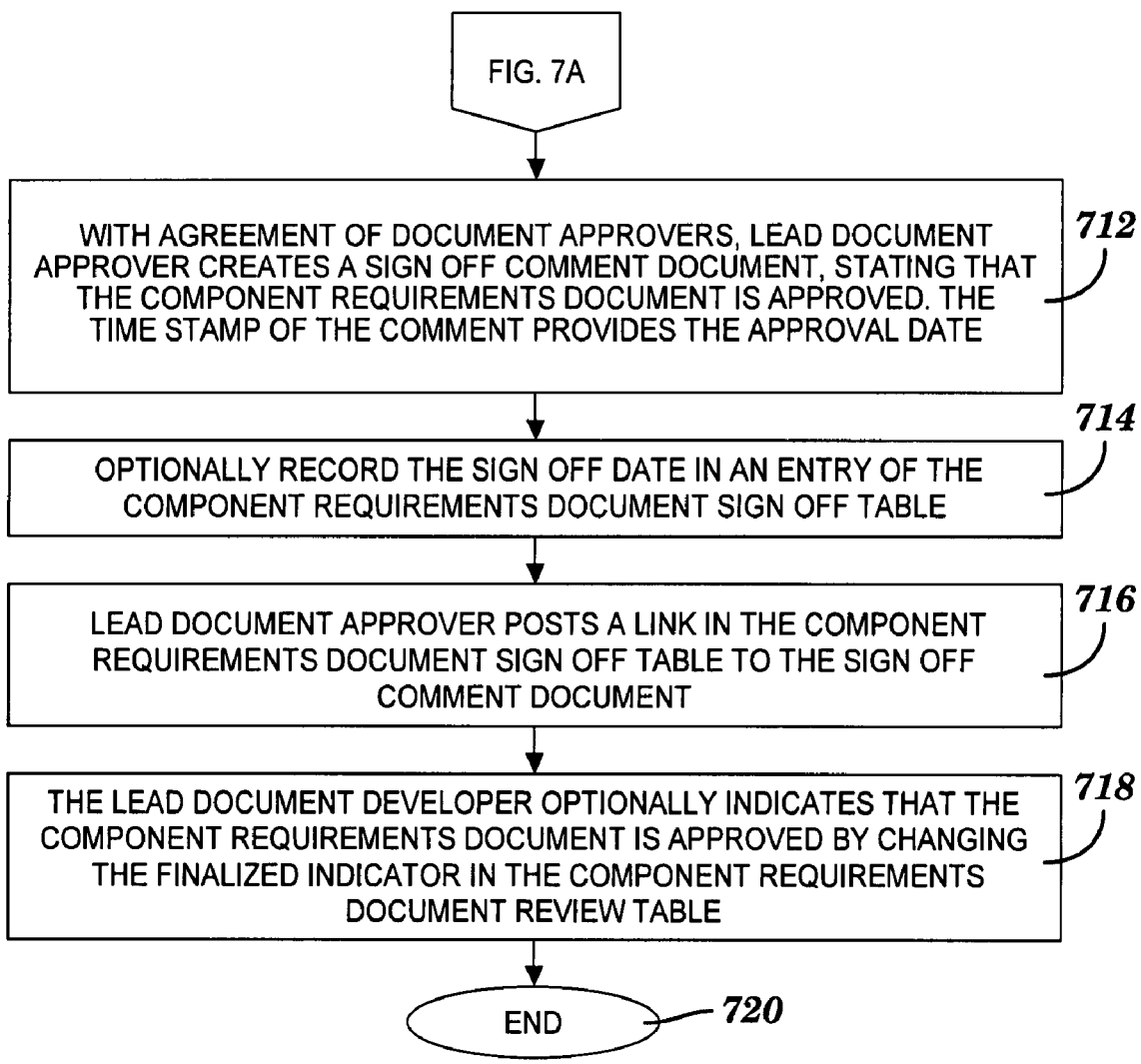

FIGS. 7A-7B depict a flow diagram of a component requirement document approval process included in the process of FIG. 2, in accordance with embodiments of the present invention. The component requirements document approval process begins at step 700 in FIG. 7A. In step 702, the second database document created in step 204 (see FIG. 2) is configured so that only the lead document approver and the lead document developer have edit access to the sign off table 128 (see FIG. 1). The configuration in step 702 occurs prior to the initiation of the process of approving the component requirements document by the document approvers.

In step 704, database management system 122 (see FIG. 1) displays review table 126 (see FIG. 1) to the lead document developer to allow the lead document developer to check the first database document for annotations such as the annotation generated and inserted in step 612 (see FIG. 6). Based on the aforementioned check for annotations in review table 126 (see FIG. 1), the lead document developer identifies the annotation inserted into review table 126 (see FIG. 1) in step 612 (see FIG. 6). The identified annotation indicates that component requirements document 130 (see FIG. 1) is ready for sign off by the document approvers (i.e., the review of the component requirements document is complete and the process of approving the component requirements document is ready to be initiated).

In step 706, the lead document developer posts links to component requirements document 130 (see FIG. 1) and the one or more related charts 132 (see FIG. 1) to sign off table 128 (see FIG. 1), which resides in the second database document created in step 204 (see FIG. 2). The posting in step 706 results in database management system 122 (see FIG. 1) inserting the links to the component requirements document 130 (see FIG. 1) and to the one or more related charts 132 (see FIG. 1) into sign off table 128 (see FIG. 1). The links are inserted in step 706 using a linking function native to, for example, a Lotus® Notes® document. Step 706 also includes the posting of other information by the lead document developer. The other information posted in step 706 includes the component name (i.e., an identifier of the component), and optionally includes one or more links to review meeting minutes and other notes, and optionally includes the date that the link to document 130 (see FIG. 1) was posted in step 706. The other information posted in step 706 is also inserted into to sign off table 128 (see FIG. 1) by the database management system, thereby associating the other information with the inserted component requirements document 130 (see FIG. 1) and the one or more related charts 132 (see FIG. 1).

The lead document approver checks the second database document to identify a component requirements document that is posted in sign off table 128 (see FIG. 1) but not yet approved. Based on the aforementioned check of the second database document, the lead document approver determines in step 708 that component requirements document 130 (see FIG. 1) is ready for approval.

In step 710, the lead document approver inserts identifiers (e.g., names) of the document approvers into sign off table 128 (see FIG. 1). None of the document approvers whose identifiers are inserted in step 710 are document reviewers who review the component requirements document 130 (see FIG. 1) in the process of FIG. 5. The process of approving the component requirements document continues in FIG. 7B.

The document approvers whose identifiers are inserted in step 710 review the updated component requirements document 130 (see FIG. 1) by activating the link to component requirements document 130 (see FIG. 1) that is included in sign off table 128 (see FIG. 1). Each document approver signs off on (a.k.a. approves) the component requirements document via a comment generated and saved in the second database document created in step 204 (see FIG. 2) using a native comment feature of database management system 122 (see FIG. 1) (e.g., the Add Comment feature of Lotus® Notes®). The comment provided by a document approver confirms that the component design associated with the software application is correct. In response to saving the comment, a timestamp and an identifier of the document approver who created the comment are recorded. In one embodiment, the document approvers are the owners of the software application associated with the component requirements.

In step 712 of FIG. 7B, the lead document approver creates a sign off comment document and saves the sign off comment document in the second database document using a native comment feature of database management system 122 (see FIG. 1) (e.g., the Add Comment feature of Lotus® Notes®) The sign off comment states that the component requirements document 130 (see FIG. 1) is approved and optionally includes any concerns raised by the lead document approver. In response to creating the sign off comment document in step 712, a native feature of database management system 122 (see FIG. 1) automatically records and inserts into the sign off comment document: (1) a timestamp of the creation of the sign off comment document in step 712 and (2) an identifier of the person who created the sign off comment document in step 712. The automatically recorded timestamp provides the approval date of the component requirements document 130 (see FIG. 1).

In step 714, the lead document approver optionally records the approval date in an entry of sign off table 128 (see FIG. 1). In step 716, the lead document approver posts to sign off table 128 (see FIG. 1) the sign off comment document created in step 712. In response to the posting in step 716, database management system 122 (see FIG. 1) inserts a link into sign off table 128 (see FIG. 1), where the link is a hyperlink to the sign off comment document created in step 712. The link is inserted in step 716 using a linking function native to, for example, a Lotus® Notes® document.

In step 718, the lead document developer optionally indicates that the component requirements document 130 (see FIG. 1) is approved by changing a finalized indicator in review table 126 (see FIG. 1). For example, the lead document developer changes the indicator in a "Finalized" column of review table 126 (see FIG. 1) from N to Y (i.e., changes the indication of document 130 (see FIG. 1) being approved from No to Yes). No additional changes to the component are allowed without a request from the customer. The component requirements document approval process ends at step 720.

Following the process of FIGS. 7A-7B and for auditability purposes, the lead document developer activates the link to the sign off comment to view any concerns raised by the lead document approver. Document review management system 120 (see FIG. 1) displays the timestamp indicating the approval date and the identifier of the person who created the sign off comment in step 712, thereby facilitating auditability of the process for reviewing and approving the component requirements document 130 (see FIG. 1).

In one embodiment, a single collaborative application such as Lotus® Notes® has native functionality that provides the capability to post links to the component requirements document and the one or more related charts in step 310 (see FIG. 3), generate and a review meeting invitation in step 402 (see FIG. 4), create a link in the review meeting invitation to a database document, send the review meeting invitation via email in step 412 (see FIG. 4), read the component requirements document in step 506 (see FIG. 1), record a meeting minutes document in step 514 (see FIG. 5), post a link to a meeting minutes document in step 516 (see FIG. 5), re-post a link to the updated component requirements document in step 604 (see FIG. 6), post a ready for approval annotation in a review table in step 612 (see FIG. 6), post links to the component requirements document and to the one or more related charts in step 706 (see FIG. 7A), create a sign off comment document in step 712 (see FIG. 7B), and post a link to the comment document in step 716 (see FIG. 7B).

EXAMPLE

Figure 15:
FIG. 15 depicts a screen that includes a modified version of the review table included in the screen of FIG. 14, where the review table is modified in the process of FIG. 6, in accordance with embodiments of the present invention.

FIGS. 8-20 illustrate of key steps in an exemplary review and approval process for a component requirements document associated with a project named CSP. The component requirements document describes a customer's required changes to a Component X. FIGS. 8 and 9 illustrate steps 202 and 204 (see FIG. 2), respectively. FIGS. 10-12 illustrate steps of FIG. 3. FIGS. 13-14 illustrate steps of FIG. 5. FIG. 15 illustrates a step of FIG. 6. FIGS. 16-20 illustrate steps of FIGS. 7A-7B.

FIG. 8 depicts a screen 800 that includes a structure of an example of review table 126 (see FIG. 1), which is created in step 202 (see FIG. 2) by the lead document developer. In this example, the sample review table is created in a Lotus® Notes® database document. The review table is included in the section of screen 800 that is labeled "Body." The review table includes columns labeled Component name, Meeting minutes link, Review Charts/documents, Author, Review date and Finalized.

FIG. 9 depicts a screen 900 that includes a structure of an example of sign off table 128 (see FIG. 1), which is created in step 204 (see FIG. 2) by the lead document developer. In this example, the sample sign off table is created in a Lotus® Notes® database document, which is different from the database document that includes the sample review table shown in screen 800 (see FIG. 8). The sign off table is included in the section of screen 900 that is labeled "Body." The sign off table includes columns labeled Component name, Meeting minutes link, Reviewed Charts/documents for sign off, Document posted date, Approver names, Sign off date and Sign off link.

FIG. 10 depicts an excerpt 1000 of an example of component requirements document 130 (see FIG. 1) associated with component X. The component requirements document is developed in step 302 (see FIG. 3) by document developers and stored in a Microsoft® Word document named Component_X_Specs v1.0.doc. Excerpt 1000 includes a reference to the component changes section of the component requirements document. In this example, the component changes section is entitled "Highlights of the component X changes."

FIG. 11 depicts a sample component changes section 1100, which is included in the component requirements document whose excerpt is depicted in FIG. 10. Component changes section 1100 is developed by document developers in step 304 (see FIG. 3). The label [NEW] indicates a new functionality to be added to component X, [ENHANCEMENT] indicates a change to an existing functionality of component X, and [BAU] indicates a business as usual functionality (i.e., no change to existing functionality) of component X.

Although not illustrated by a figure in this example, step 306 (see FIG. 3) generates a PowerPoint® presentation that includes charts that are examples of charts 132 (see FIG. 1). The file that stores the PowerPoint® presentation is named Component_X_Charts v1.0.ppt.

FIG. 12 depicts a screen 1200 that includes a modified version of the sample review table included in screen 800 (see FIG. 8). The review table in screen 1200 is the result of performing steps 310 and 312 of FIG. 3. One or more document developers modify the review table in step 310 (see FIG. 3) by posting a link to the component requirements document stored in Component_X_Specs v1.0.doc and a link to the related charts stored in Component_X_Charts v1.0.ppt. Step 310 (see FIG. 3) inserts the aforementioned links to Component_X_Specs v1.0.doc and Component_X_Charts v1.0.ppt in the Review Charts/documents column of the review table. In step 312 (see FIG. 3), a document developer posts the name of the component (i.e., Component X) in the Component name column, the author of the component requirements document (i.e., John Doe) in the Author column, and a date scheduled for the review meeting (i.e., 08/06/2007) in the Review date column of the review table.

Although not depicted in figures in this example, an invitation to the review meeting is generated and sent to the document reviewers according to the process of FIG. 4. The review meeting of this example is conducted on 08/06/2007, according to the steps of FIG. 5.

FIG. 13 depicts a screen 1300 that includes an exemplary meeting minutes document provided by Lotus® Notes®. In step 514 (see FIG. 5), the lead document developer uses screen 1300 to record any issues/concerns regarding the component requirements document which were raised at the review meeting.

FIG. 14 depicts a screen 1400 that includes a modified version of the review table included in screen 1200 (see FIG. 12). The review table in screen 1400 is the result of performing step 516 (see FIG. 5). In step 516 (see FIG. 5), the lead document developer modifies the review table by posting a link to the meeting minutes document that was created using screen 1300 (see FIG. 13). The link to the meeting minutes document is inserted in the Meeting minutes link column of the review table of screen 1400 and is labeled "Minutes link on 08/06/2007:". A link to additional notes is also placed in the Meeting minutes link column by a document developer.

FIG. 15 depicts a screen 1500 that includes a modified version of the review table included in screen 1400 (see FIG. 14). The review table in screen 1500 is the result of performing step 612 (see FIG. 6). In step 612 (see FIG. 6), document developer John Doe modifies the review table by inserting the annotation "Ready for sign off (8/12/2007)" in the Review Charts/documents column of the review table. The annotation shown in screen 1500 and inserted in step 612 indicates that the component requirements document is ready for approval and indicates the date the component requirements document is ready for approval.

FIG. 16 depicts a screen 1600 that includes a modified version of the sign off table included in screen 900 (see FIG. 9). The sign off table in screen 1600 is the result of performing step 706 (see FIG. 7A) on 8/12/2007. In step 706 (see FIG. 7A), the lead document developer posts "Component X" in the Component name column, the links to the review meeting minutes and the additional notes in the Meeting minutes column, and the date (i.e., 08/12/2007) that the component requirements document was posted to the sign off table. The links in the Meeting minutes column of the sign off table are identical to the links in the review table column of the same name. Furthermore, step 706 (see FIG. 7A) includes the lead document developer posting links to Component_X_Specs v1.0.doc and Component_X_Charts v1.0.ppt in the Reviewed Charts/documents for sign off column of the sign off table.

Figure 17:
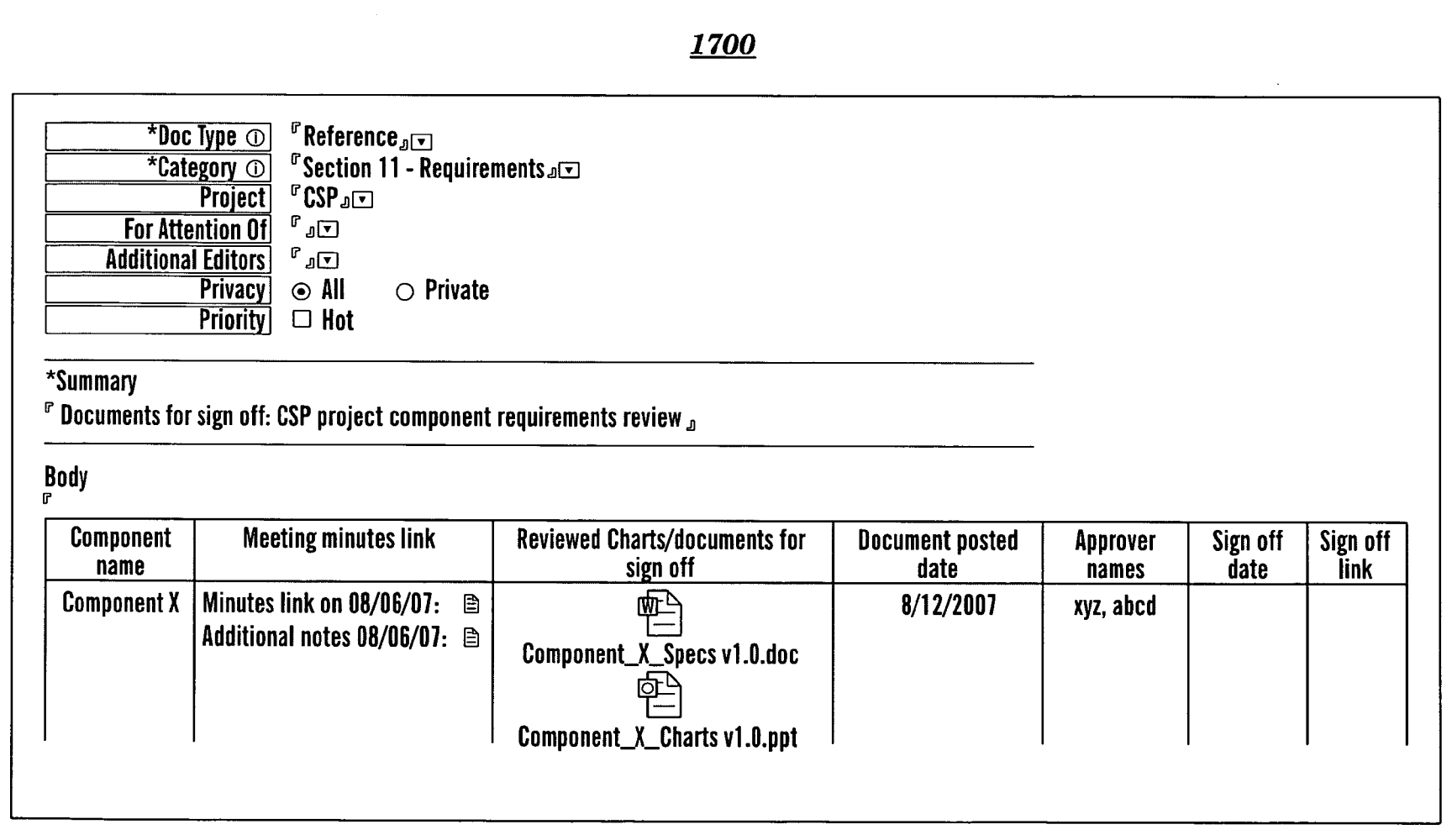

FIG. 17 depicts a screen 1700 that includes a modified version of the sign off table included in screen 1600 (see FIG. 16). The sign off table included in screen 1700 is the result of performing step 710 (see FIG. 7A). In step 710, the lead document approver inserts names of document approvers (i.e., xyz, abcd) in the Approver names column of the sign off table.

FIG. 18 depicts an exemplary sign off comment document 1800 created in the process of FIGS. 7A-7B. After approvers xyz and abcd approve the component requirements document for Component X, the lead document approver creates and saves sign off comment document 1800 in step 712 (see FIG. 7B). The timestamp of the sign off comment document 1800 indicates the date 08/16/2007, which is considered the sign off date for the component requirements document.

FIG. 19 depicts a screen 1900 that includes a modified version of the sign off table included in the screen 1700 (see FIG. 17). The sign off table in screen 1900 is the result of performing steps 714 and 716 (see FIG. 7B). In step 714 (see FIG. 7B), the lead document approver records the sign off date (i.e., 08/16/2007) in the Sign off date column of the sign off table, as shown in screen 1900. In step 716 (see FIG. 7B), the lead document approver posts a link to the sign off comment document 1800, where the link is posted in the Sign off link column of the sign off table, as shown in screen 1900.

Figure 20:
FIG. 20 depicts a screen that includes a modified version of the review table included in the screen of FIG. 15, where the review table is modified in the process of FIGS. 7A-7B, in accordance with embodiments of the present invention.

FIG. 20 depicts a screen 2000 that includes a modified version of the review table included in screen 1500 (see FIG. 15). The review table in screen 2000 is the result of performing step 718 (see FIG. 7B). In step 718 (see FIG. 7B), the lead document developer modifies the review table by changing the indicator in the finalized column from N to Y, which indicates that the component requirements document for Component X is approved. No additional changes to Component X are allowed without a request from the customer.

Computing System

Figure 21:
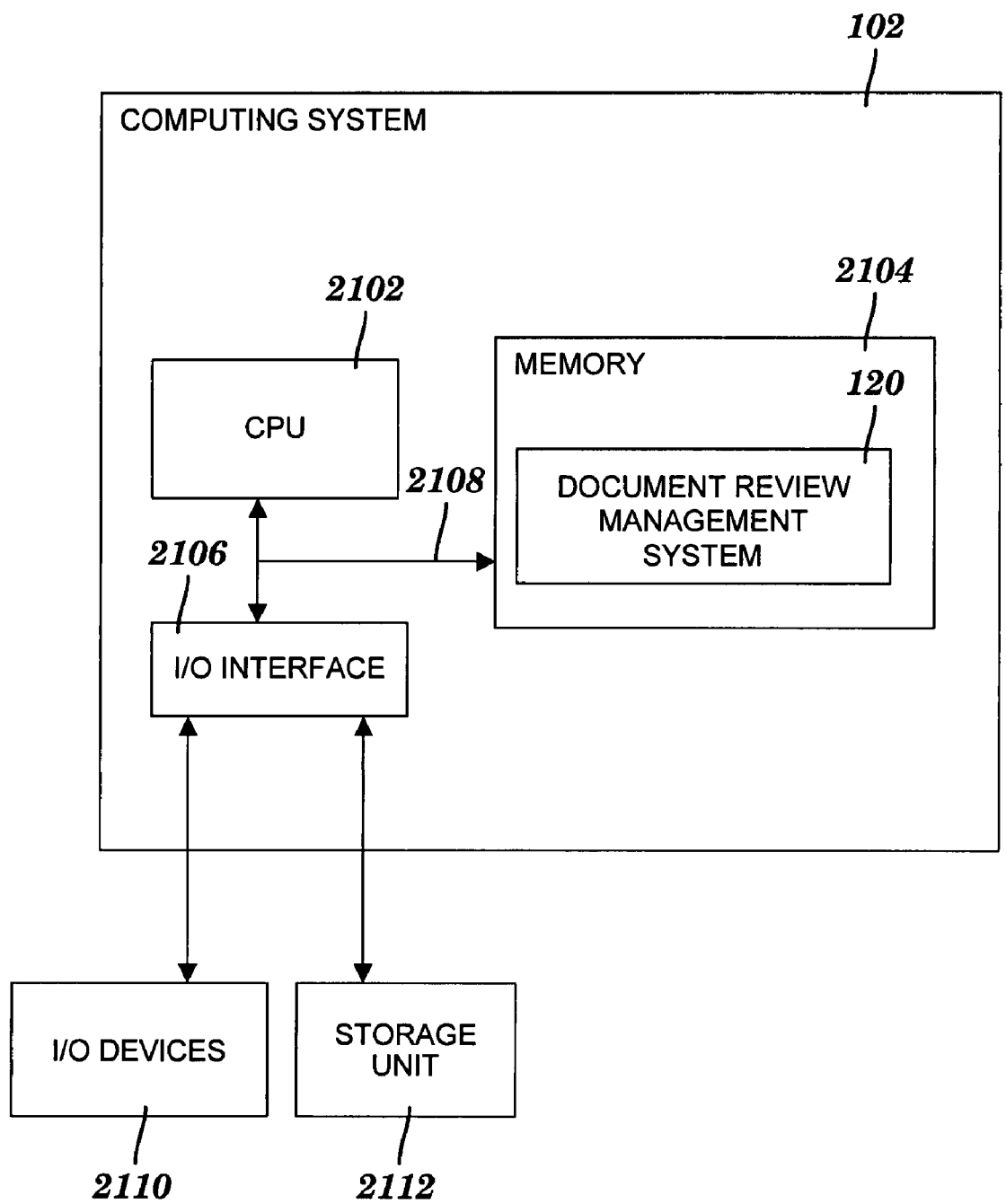
FIG. 21 is a block diagram of a computing system that is included in the system of FIG. 1 and that implements the process of FIG. 2, in accordance with embodiments of the present invention.

FIG. 21 is a block diagram of a computing system that is included in the system of FIG. 1 and that implements the process of FIG. 2, in accordance with embodiments of the present invention. Computing system 102 generally comprises a central processing unit (CPU) 2102, a memory 2104, an input/output (I/O) interface 2106, a bus 2108, I/O devices 2110 and a storage unit 2112. CPU 2102 performs computation and control functions of computing system 102. CPU 2102 may comprise a single processing unit, or be distributed across one or more processing units in one or more locations (e.g., on a client and server).

Memory 2104 may comprise any known type of data storage and/or transmission media, including bulk storage, magnetic media, optical media, random access memory (RAM), read-only memory (ROM), a data cache, a data object, etc. Cache memory elements of memory 2104 provide temporary storage of at least some program code in order to reduce the number of times code must be retrieved from bulk storage during execution. Storage unit 2112 is, for example, a magnetic disk drive or an optical disk drive that stores data. Moreover, similar to CPU 2102, memory 2104 may reside at a single physical location, comprising one or more types of data storage, or be distributed across a plurality of physical systems in various forms. Further, memory 2104 can include data distributed across, for example, a LAN, WAN or storage area network (SAN) (not shown).

I/O interface 2106 comprises any system for exchanging information to or from an external source. I/O devices 2110 comprise any known type of external device, including a display monitor, keyboard, mouse, printer, speakers, hand-held device, printer, facsimile, etc. Bus 2108 provides a communication link between each of the components in computing system 102, and may comprise any type of transmission link, including electrical, optical, wireless, etc.

I/O interface 2106 also allows computing system 102 to store and retrieve information (e.g., program instructions or data) from an auxiliary storage device (e.g., storage unit 2112). The auxiliary storage device may be a non-volatile storage device (e.g., a CD-ROM drive which receives a CD-ROM disk). Computing system 102 can store and retrieve information from other auxiliary storage devices (not shown), which can include a direct access storage device (DASD) (e.g., hard disk or floppy diskette), a magneto-optical disk drive, a tape drive, or a wireless communication device.

Memory 2104 includes program code for document review management system 120. Further, memory 2104 may include other systems not shown in FIG. 7, such as an operating system (e.g., Linux) that runs on CPU 2102 and provides control of various components within and/or connected to computing system 102.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code 120 for use by or in connection with a computing system 102 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infared, or semiconductor system (or apparatus or device) or a propagation medium. Examples of a computer-readable medium include a semiconductor or solid state memory, magnetic tape, a removable computer diskette, RAM 2104, ROM, a rigid magnetic disk and an optical disk. Current examples of optical disks include compact disk—read-only memory (CD-ROM), compact disk—read/write (CD-R/W) and DVD.

Any of the components of the present invention can be deployed, managed, serviced, etc. by a service provider that offers to deploy or integrate computing infrastructure with respect to the method of reviewing a component requirements document. Thus, the present invention discloses a process for supporting computer infrastructure, comprising integrating, hosting, maintaining and deploying computer-readable code into a computing system (e.g., computing system 102), wherein the code in combination with the computing unit is capable of performing a method of reviewing a component requirements document.

In another embodiment, the invention provides a business method that performs the process steps of the invention on a subscription, advertising and/or fee basis. That is, a service provider, such as a Solution Integrator, can offer to create, maintain, support, etc. a method of reviewing a component requirements document. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of reviewing a component requirements document, said method comprising:
  inserting, via a computing system, a document link into a review table residing in a database managed by said computing system, wherein said document link is a hyperlink to said component requirements document, and wherein said component requirements document includes a description of a component of a custom software application and a description of one or more changes required for said component;
  inserting, via said computing system, a chart link into said review table, wherein said chart link is a hyperlink to a chart document that includes a condensed version of said component requirements document, and wherein said condensed version includes said description of said one or more changes;
  displaying, via said computing system, said component requirements document for a review of said component requirements document by a plurality of reviewers prior to a review meeting, wherein said displaying said component requirements document is a result of a plurality of activations of said document link by said plurality of reviewers;

displaying, via said computing system and during said review meeting, said condensed version to said plurality of reviewers for a review of said one or more changes by said plurality of reviewers, wherein said displaying said condensed version is a result of a plurality of activations of said chart link by said plurality of reviewers;

inserting, via said computing system and in response to a completion of said review of said one or more changes, an annotation into said review table, wherein said annotation indicates a readiness for an approval process in which said component requirements document is approved by a plurality of approvers;

displaying, via said computing system, said review table subsequent to said inserting said annotation;

initiating, via said computing system, said approval process in which said component requirements document is approved by said plurality of approvers, wherein said initiating said approval process is a result of an identification of said annotation subsequent to said displaying said review table, and wherein said initiating said approval process includes inserting, via said computing system, said document link and said chart link into a sign off table residing in said database;

receiving, via said computing system, an approval of said component requirements document by said plurality of approvers, wherein said approval of said component requirements document is based on a viewing of said component requirements document by said plurality of approvers, said viewing being a result of an activation of said document link in said sign off table by said plurality of approvers;

receiving, via said computing system, a sign off comment document, wherein said sign off comment document includes an indication that said component requirements document is approved by said plurality of approvers;

automatically inserting, via said computing system and in response to said receiving said sign off comment document, a timestamp of said receiving said sign off comment document and a person identifier, wherein said person identifier identifies a person who created said sign off comment document; and inserting, via said computing system, a comment link into said sign off table, wherein said comment link is a hyperlink to said sign off comment document.

2. The method of claim 1, further comprising:

sending, via an email system included in said computing system, an invitation to said plurality of reviewers, wherein said invitation includes a review table link, and wherein said review table link is a hyperlink to said review table; and displaying, via said computing system and prior to said review meeting, said review table to said plurality of reviewers, wherein said displaying said review table is a result of activating said review table link included in said invitation, wherein said displaying said review table includes displaying said document link, and wherein said displaying said document link facilitates said plurality of activations of said document link.

3. The method of claim 2, wherein said displaying said review table further includes:

displaying a component identifier that identifies said component; and displaying a review date that identifies a date of said review meeting, wherein said component identifier and said review date are associated with said document link in said review table, and wherein said plurality of activations of said document link is a result of an identification of said review date and said component identifier by said plurality of reviewers subsequent to said displaying said review date and subsequent to said displaying said component identifier.

4. The method of claim 2, wherein said email system and said database are controlled by a single collaborative software application.

5. The method of claim 1, further comprising:

inserting, via said computing system and subsequent to said review meeting, a meeting minutes link in said review table, wherein said meeting minutes link is a hyperlink to a meeting minutes document that includes one or more issues raised by one or more reviewers of said plurality of reviewers during said review meeting;

displaying, via said computing system, said meeting minutes document to a document developer, wherein said displaying said meeting minutes document is a result of activating said meeting minutes link by said document developer subsequent to said review meeting;

receiving, via said computing system, an updated version of said component requirements document, said updated version of said component requirements document generated by said document developer based on said on or more issues included in said meeting minutes document; and re-inserting, via said computing system, said document link into said review table, wherein said re-inserted document link is a hyperlink to said updated version of said component requirements document.

6. A computing system comprising:

a processor; and a storage memory unit coupled to said processor, said memory unit containing instructions that are carried out by said processor to implement a method of reviewing a component requirements document, said method comprising:

inserting a document link into a review table residing in a database managed by said computing system, wherein said document link is a hyperlink to said component requirements document, and wherein said component requirements document includes a description of a component of a custom software application and a description of one or more changes required for said component;

inserting a chart link into said review table, wherein said chart link is a hyperlink to a chart document that includes a condensed version of said component requirements document, and wherein said condensed version includes said description of said one or more changes;

displaying said component requirements document for a review of said component requirements document by a plurality of reviewers prior to a review meeting, wherein said displaying said component requirements document is a result of a plurality of activations of said document link by said plurality of reviewers;

displaying, during said review meeting, said condensed version to said plurality of reviewers for a review of said one or more changes by said plurality of reviewers, wherein said displaying said condensed version is a result of a plurality of activations of said chart link by said plurality of reviewers;

inserting, in response to a completion of said review of said one or more changes, an annotation into said review table, wherein said annotation indicates a readiness for an approval process in which said component requirements document is approved by a plurality of approvers;

displaying said review table subsequent to said inserting said annotation;

initiating said approval process in which said component requirements document is approved by said plurality of approvers, wherein said initiating said approval process is a result of an identification of said annotation subsequent to said displaying said review table, and wherein said initiating said approval process includes inserting said document link and said chart link into a sign off table residing in said database;

receiving an approval of said component requirements document by said plurality of approvers, wherein said approval of said component requirements document is based on a viewing of said component requirements document by said plurality of approvers, said viewing being a result of an activation of said document link in said sign off table by said plurality of approvers;

receiving a sign off comment document, wherein said sign off comment document includes an indication that said component requirements document is approved by said plurality of approvers;

automatically inserting, in response to said receiving said sign off comment document, a timestamp of said receiving said sign off comment document and a person identifier, wherein said person identifier identifies a person who created said sign off comment document; and inserting a comment link into said sign off table, wherein said comment link is a hyperlink to said sign off comment document.

7. The computing system of claim 6, wherein said method further comprises:

sending, via an email system included in said computing system, an invitation to said plurality of reviewers, wherein said invitation includes a review table link, and wherein said review table link is a hyperlink to said review table; and displaying, prior to said review meeting, said review table to said plurality of reviewers, wherein said displaying said review table is a result of activating said review table link included in said invitation, wherein said displaying said review table includes displaying said document link, and wherein said displaying said document link facilitates said plurality of activations of said document link.

8. The computing system of claim 7, wherein said displaying said review table further includes:

displaying a component identifier that identifies said component; and displaying a review date that identifies a date of said review meeting, wherein said component identifier and said review date are associated with said document link in said review table, and wherein said plurality of activations of said document link is a result of an identification of said review date and said component identifier by said plurality of reviewers subsequent to said displaying said review date and subsequent to said displaying said component identifier.

9. The computing system of claim 7, wherein said email system and said database are controlled by a single collaborative software application.

10. The computing system of claim 6, wherein said method further comprises:

inserting, subsequent to said review meeting, a meeting minutes link in said review table, wherein said meeting minutes link is a hyperlink to a meeting minutes document that includes one or more issues raised by one or more reviewers of said plurality of reviewers during said review meeting;

displaying said meeting minutes document to a document developer, wherein said displaying said meeting minutes document is a result of activating said meeting minutes link by said document developer subsequent to said review meeting;

receiving an updated version of said component requirements document, said updated version of said component requirements document generated by said document developer based on said on or more issues included in said meeting minutes document; and re-inserting said document link into said review table, wherein said re-inserted document link is a hyperlink to said updated version of said component requirements document.

11. A computer program product, comprising a computer readable storage medium having a computer readable program code embodied therein, said computer readable program code containing instructions that are carried out by a processor of a computing system to implement a method of reviewing a component requirements document, said method comprising:

inserting a document link into a review table residing in a database managed by said computing system, wherein said document link is a hyperlink to said component requirements document, and wherein said component requirements document includes a description of a component of a custom software application and a description of one or more changes required for said component;

inserting a chart link into said review table, wherein said chart link is a hyperlink to a chart document that includes a condensed version of said component requirements document, and wherein said condensed version includes said description of said one or more changes;

displaying said component requirements document for a review of said component requirements document by a plurality of reviewers prior to a review meeting, wherein said displaying said component requirements document is a result of a plurality of activations of said document link by said plurality of reviewers;

displaying, during said review meeting, said condensed version to said plurality of reviewers for a review of said one or more changes by said plurality of reviewers, wherein said displaying said condensed version is a result of a plurality of activations of said chart link by said plurality of reviewers;

inserting, in response to a completion of said review of said one or more changes, an annotation into said review table, wherein said annotation indicates a readiness for an approval process in which said component requirements document is approved by a plurality of approvers;

displaying said review table subsequent to said inserting said annotation;

initiating said approval process in which said component requirements document is approved by said plurality of approvers, wherein said initiating said approval process is a result of an identification of said annotation subsequent to said displaying said review table, and wherein said initiating said approval process includes inserting said document link and said chart link into a sign off table residing in said database;

receiving an approval of said component requirements document by said plurality of approvers, wherein said approval of said component requirements document is based on a viewing of said component requirements document by said plurality of approvers, said viewing being a result of an activation of said document link in said sign off table by said plurality of approvers;

receiving a sign off comment document, wherein said sign off comment document includes an indication that said component requirements document is approved by said plurality of approvers;

automatically inserting, in response to said receiving said sign off comment document, a timestamp of said receiving said sign off comment document and a person identifier, wherein said person identifier identifies a person who created said sign off comment document; and inserting a comment link into said sign off table, wherein said comment link is a hyperlink to said sign off comment document.

12. The program product of claim 11, wherein said method further comprises:

sending, via an email system included in said computing system, an invitation to said plurality of reviewers, wherein said invitation includes a review table link, and wherein said review table link is a hyperlink to said review table; and displaying, prior to said review meeting, said review table to said plurality of reviewers, wherein said displaying said review table is a result of activating said review table link included in said invitation, wherein said displaying said review table includes displaying said document link, and wherein said displaying said document link facilitates said plurality of activations of said document link.

13. The program product of claim 12, wherein said displaying said review table further includes:

displaying a component identifier that identifies said component; and displaying a review date that identifies a date of said review meeting, wherein said component identifier and said review date are associated with said document link in said review table, and wherein said plurality of activations of said document link is a result of an identification of said review date and said component identifier by said plurality of reviewers subsequent to said displaying said review date and subsequent to said displaying said component identifier.

14. The program product of claim 12, wherein said email system and said database are controlled by a single collaborative software application.

15. The program product of claim 11, wherein said method further comprises:

inserting, subsequent to said review meeting, a meeting minutes link in said review table, wherein said meeting minutes link is a hyperlink to a meeting minutes document that includes one or more issues raised by one or more reviewers of said plurality of reviewers during said review meeting;

displaying said meeting minutes document to a document developer, wherein said displaying said meeting minutes document is a result of activating said meeting minutes link by said document developer subsequent to said review meeting;

receiving an updated version of said component requirements document, said updated version of said component requirements document generated by said document developer based on said on or more issues included in said meeting minutes document; and re-inserting said document link into said review table, wherein said re-inserted document link is a hyperlink to said updated version of said component requirements document.

16. A process for supporting computing infrastructure, said process comprising providing at least one support service for at least one of creating, integrating, hosting, maintaining, and deploying computer-readable code in a computing system comprising a processor, wherein the code when carried out by said processor, causes the computing system to specify a method of reviewing a component requirements document, said method comprising:

inserting a document link into a review table residing in a database managed by said computing system, wherein said document link is a hyperlink to said component requirements document, and wherein said component requirements document includes a description of a component of a custom software application and a description of one or more changes required for said component;

inserting a chart link into said review table, wherein said chart link is a hyperlink to a chart document that includes a condensed version of said component requirements document, and wherein said condensed version includes said description of said one or more changes;

displaying said component requirements document for a review of said component requirements document by a plurality of reviewers prior to a review meeting, wherein said displaying said component requirements document is a result of a plurality of activations of said document link by said plurality of reviewers;

displaying, during said review meeting, said condensed version to said plurality of reviewers for a review of said one or more changes by said plurality of reviewers, wherein said displaying said condensed version is a result of a plurality of activations of said chart link by said plurality of reviewers;

inserting, in response to a completion of said review of said one or more changes, an annotation into said review table, wherein said annotation indicates a readiness for an approval process in which said component requirements document is approved by a plurality of approvers;

displaying said review table subsequent to said inserting said annotation;

initiating said approval process in which said component requirements document is approved by said plurality of approvers, wherein said initiating said approval process is a result of an identification of said annotation subsequent to said displaying said review table, and wherein said initiating said approval process includes inserting said document link and said chart link into a sign off table residing in said database;

receiving an approval of said component requirements document by said plurality of approvers, wherein said approval of said component requirements document is based on a viewing of said component requirements document by said plurality of approvers, said viewing being a result of an activation of said document link in said sign off table by said plurality of approvers;

receiving a sign off comment document, wherein said sign off comment document includes an indication that said component requirements document is approved by said plurality of approvers;

automatically inserting, in response to said receiving said sign off comment document, a timestamp of said receiving said sign off comment document and a person identifier, wherein said person identifier identifies a person who created said sign off comment document; and inserting a comment link into said sign off table, wherein said comment link is a hyperlink to said sign off comment document.

17. The process of claim 16, wherein said method further comprises:

sending, via an email system included in said computing system, an invitation to said plurality of reviewers, wherein said invitation includes a review table link, and wherein said review table link is a hyperlink to said review table; and displaying, prior to said review meeting, said review table to said plurality of reviewers, wherein said displaying said review table is a result of activating said review table link included in said invitation, wherein said displaying said review table includes displaying said document link, and wherein said displaying said document link facilitates said plurality of activations of said document link.

18. The process of claim 17, wherein said displaying said review table further includes:

displaying a component identifier that identifies said component; and displaying a review date that identifies a date of said review meeting, wherein said component identifier and said review date are associated with said document link in said review table, and wherein said plurality of activations of said document link is a result of an identification of said review date and said component identifier by said plurality of reviewers subsequent to said displaying said review date and subsequent to said displaying said component identifier.

\* \* \* \* \*